US010657469B2

(12) United States Patent
Bade et al.

(10) Patent No.: US 10,657,469 B2
(45) Date of Patent: May 19, 2020

(54) AUTOMATED SECURITY INCIDENT HANDLING IN A DYNAMIC ENVIRONMENT

(71) Applicant: International Business Machines Corporation, Armonk, NY (US)

(72) Inventors: Steven A. Bade, Sharon Springs, NY (US); Heather M. Hinton, Austin, TX (US); Neil I. Readshaw, Parkwood (AU); Srinivas B. Tummalapenta, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 14/250,789

(22) Filed: Apr. 11, 2014

(65) Prior Publication Data
US 2015/0294244 A1 Oct. 15, 2015

(51) Int. Cl.
*G06Q 10/00* (2012.01)
*G06Q 10/06* (2012.01)

(52) U.S. Cl.
CPC ................. *G06Q 10/063* (2013.01)

(58) Field of Classification Search
CPC .................................................. G06Q 10/063
USPC ...................... 705/7.11, 7.29, 7.28
See application file for complete search history.

(56) References Cited

U.S. PATENT DOCUMENTS

| 9,767,677 | B1* | 9/2017 | Paulin | G08B 25/016 |
| 9,906,554 | B2* | 2/2018 | Higbee | G06F 16/35 |
| 2002/0138417 | A1* | 9/2002 | Lawrence | G06Q 30/02 705/38 |
| 2004/0006532 | A1* | 1/2004 | Lawrence | G06Q 30/02 705/38 |
| 2008/0162352 | A1* | 7/2008 | Gizewski | G06F 19/3456 705/50 |
| 2013/0117185 | A1* | 5/2013 | Collison | G06Q 20/3829 705/67 |
| 2014/0201836 | A1* | 7/2014 | Amsler | H04L 63/20 726/23 |
| 2016/0044035 | A1* | 2/2016 | Huang | H04L 63/0272 726/4 |

FOREIGN PATENT DOCUMENTS

| EP | 2566130 A1 | 3/2013 |
| WO | 2012103236 A1 | 8/2012 |

OTHER PUBLICATIONS

Farzad Sabahi, Cloud Computing Security Threats and Responses, 2011, IEEE, All Pages (Year: 2011).*

(Continued)

*Primary Examiner* — Hafiz A Kassim
*Assistant Examiner* — Zahra Elkassabgi
(74) *Attorney, Agent, or Firm* — Stephen R. Yoder

(57) ABSTRACT

In a method for estimating a severity of a current security incident reported by a customer for the customer's computer system, a processor receives from one or more administrators for a plurality of prior security incidents reported by the customer, identifications of a respective plurality of actual severities for the plurality of prior security incidents. The processor estimates, based in part on the plurality of identified actual severities of the prior security incidents, a severity of the current security incident. The processor reports the estimated severity for the current security incident.

18 Claims, 3 Drawing Sheets

(56) References Cited

OTHER PUBLICATIONS

Buecker et al., "Cloud Security Guidance—IBM Recommendations for the Implementation of Cloud Security", IBM® Redpapers™, pp. 1-22, REDP-4614-00 was created or updated on Nov. 2, 2009.
Buecker et al., "Stopping Internet Threats Before They Affect Your Business by Using the IBM Security Network Intrusion Prevention System", IBM® Redguide™, pp. 1-40, REDP-4683-00, was created or updated on Jan. 21, 2011.
"Trend Micro Cloud Secuirty for Citrix CloudPlatform", Trend Micro™ and Citrix | Solution Brief, Copyright © 2013 Citrix Systems, Inc., pp. 1-5.
"Trend Micro Deep Security—Meeting PCI DSS V 2.0 Compliance Requirements", Trend Micro™, pp. 1-4, © 2010 Trend Micro, Incorporated.
"Value measuring methodology", Wikipedia, the free encyclopedia, page last modified on Sep. 9, 2013 at 22:39, <http://en.wikipedia.org/wiki/Value_measuring_methodology>.

\* cited by examiner

AUTOMATED SECURITY INCIDENT HANDLING IN A DYNAMIC ENVIRONMENT

FIELD OF THE INVENTION

The present invention relates generally to network security, and more specifically to responding to security incidents in a cloud-based environment.

BACKGROUND

Security incident response refers to the response of an information technology (IT) organization or system to malicious or suspicious behavior in an IT environment.

In a highly dynamic environment such as a public cloud, the ease of obtaining virtual resources increases the opportunity for attack, and, may require shut down affected resources. In this environment, companies are typically concerned with malicious traffic coming into their network. Accordingly, intrusion protection systems (IPS) and intrusion detection systems (IDS) are built and tuned to look for malicious inbound traffic. In a public cloud environment, cloud service providers (CSPs) are concerned that the virtual resources provisioned by their clients are not engaging in malicious behavior. This malicious behavior may be intentional (for example, a user signs up for a free trial VM instance on which to run an attack) or unintentional (for example, a user does not adequately protect their internet-facing virtual instance and is unwillingly hacked or compromised). In these cases, as the source of the attack or bad behavior is from within the CSP's environment, the first indication that there has been a compromise is likely through suspicious outbound traffic.

Reputational schemes are known. For example, many auto insurance programs provide discounts to users who have proven to be safe (accident and claim free) over a period of time. A methodology referred to as the value measuring methodology provides a framework within which planners balance tangible and intangible values for making decisions and monitoring benefits.

SUMMARY

Aspects of an embodiment of the present invention disclose a method, computer program product, and computing system for estimating a severity of a current security incident reported by a customer for the customer's computer system. A processor receives from one or more administrators for a plurality of prior security incidents reported by the customer, identifications of a respective plurality of actual severities for the plurality of prior security incidents. The processor estimates, based in part on the plurality of identified actual severities of the prior security incidents, a severity of the current security incident. The processor reports the estimated severity for the current security incident.

DETAILED DESCRIPTION

Some embodiments of the present invention recognize the following facts, potential problems and/or potential areas for improvement with respect to the current state of the art: (i) current approaches to monitoring and addressing security alerts are not flexible enough to provide the balance of security and business enablement required in a highly dynamic cloud environment; (ii) dynamic public cloud environments conventionally have limited incident report responses, that is, where there is suspicious behavior, shut down the machine; and/or (iii) conventional approaches to resolve incident reports include investing a great deal of timely and expensive manual intervention (as teams investigate, with the tools at hand, theorize on the possible causes of potentially malicious traffic, possibly contact the cloud user or cloud account owner, and otherwise evaluate the overall environment for clues as the most effective way to respond while balancing risk management and business concerns, recognizing that shutting down a user's instance will create customer satisfaction issues, especially in cases where the data was misinterpreted and the shut down was not warranted); and/or (iv) a reputation scheme for serving clients will support systems where some users set up well protected secure environments within a public cloud environment, while other users simply provision a default operating system image and start using it.

An intrusion protection system for a public cloud (which many different customers use) automatically tracks the reported, potential security incidents associated with each customer and their respective outcomes. Outcomes include whether the incidents were determined to be: (i) real and serious; (ii) real but not serious; or (iii) false alarms. The system establishes a "reputation" or history for each customer in the form of a security score. When a new potential security incident is reported, the system prioritizes an incident response based on the reputation/history for each customer. For example, if the potential security incident is associated with Customer A, who has a history of frequent, real, severe security incidents, the system requests a quick incident response. On the other hand, if the potential security incident is associated with Customer B, who has a history of reported security incidents that are actually false alarms or that are real, but not serious, the system does not request a quick incident response.

The present invention will now be described in detail with reference to the Figures.

Figure 1:
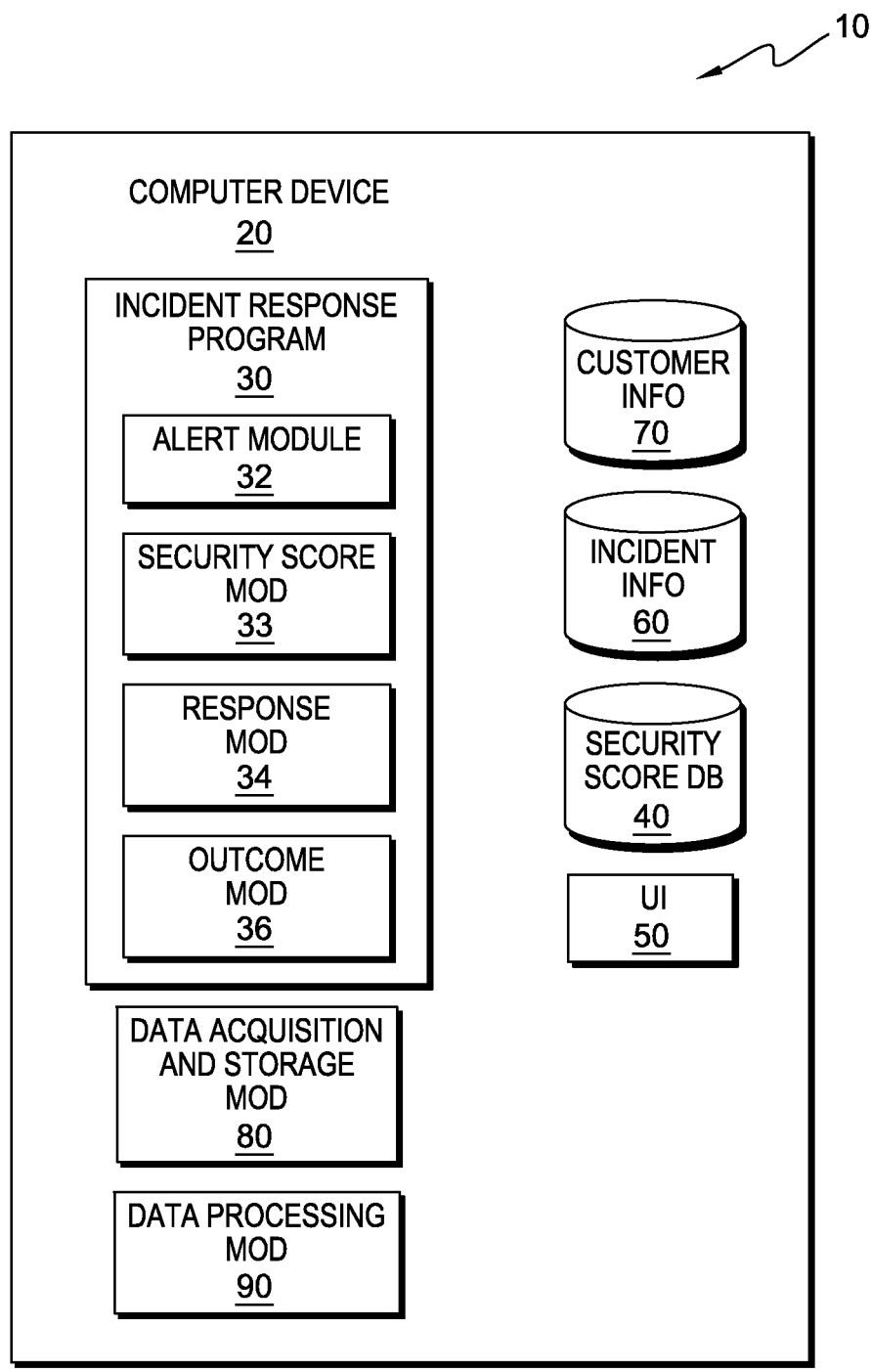
FIG. 1 depicts a diagram of a computing system in accordance with one embodiment of the present invention.

FIG. 1 depicts a diagram of computing system 10 in accordance with one embodiment of the present invention for estimating the significance of a potential security incident. FIG. 1 provides only an illustration of one embodiment and does not imply any limitations with regard to the environments in which different embodiments may be implemented.

In the depicted embodiment, computing system 10 includes computing device 20, which further includes incident response program 30, security score database 40, user interface (UI) 50, incident information store 60, customer information store 70, data acquisition and storage module 80, and data processing module 90. Computing system 10 may also include a network, server computers, client computers, or other devices not shown.

Computing device 20 collects and processes threat data and generates a security score and may be in the form of a laptop computer, tablet computer, netbook computer, personal computer (PC), a desktop computer, a personal digital assistant (PDA), or smart phone. Computing system 10 is shown as being wholly implemented on computing device 20. However, computing system 10 may operate in a distributed environment in which one or more of its components are implemented across a plurality of computing devices that communicate over a network, such as a local area network (LAN) or a wide area network (WAN), such as the Internet. For example, incident response program 30 may operate on a separate computing device having sufficient capabilities to support only the operation of the incident response program. In general, computing system 10 can execute on any computing device, or combination of computing devices, satisfying desired implementation requirements, and as described in relation to FIG. 3. Computing device 10 may include internal and external hardware components, as depicted and described in further detail with respect to FIG. 3.

In general, computing device 20 may be any electronic device or computing system capable of executing computer code and outputting an incident response decision. Computing device 20 may include internal 800 and external 900 components as depicted and described in further detail with respect to FIG. 3.

User interface (UI) 50 operates on computing device 20 to generate display signals corresponding to content, such as windows, menus, and icons, and to receive various forms of user input. In one embodiment, UI 50 comprises an interface to response module 34 of incident response program 30. UI 50 may display data received from response module 34 and send input to response module 34. UI 50 may comprise one or more interfaces such as, an operating system interface and/or application interfaces. A window manager may work with the underlying graphical system to control the placement and appearance of windows appearing on UI 50.

Data acquisition and storage module 80 operates to receive data from computing devices supporting the infrastructure that captures the telemetry of the virtual machine (VM) environment and/or computing environment. Data acquisition obtains threat-related information from devices including, but not limited to: (i) VM; (ii) firewalls; (iii) network; (iv) host instruction systems; and/or (v) external feeds.

Data processing module 90 operates to process threat-related data received by the acquisition module and locally available customer information to determine an actionable event.

Incident response program 30 executes on computing device 20 and is capable of executing alert module 32, security score module 33, response module 34, and outcome module 36. Incident response program 30 operates to estimate the significance of a potential security incident within the computing system by consulting incident information and/or customer information to determine a security score for the affected customer. The significance of potential security incidents varies according to one, or more, of the following: (i) severity of the incident; and/or (ii) effect on business relationships. The significance of the potential security incident supports establishing incident response action(s).

Some embodiments of the present invention provide a classification scheme to define the reputation of each customer. The term customer as used herein refers to one, or more, customer components including: (i) an account; (ii) individual users of an account; and (iii) virtual machine (VM) instances of an account. Customers are assigned respective security goodness (SG) scores that reflect the reputations of the customers. The SG score is one example of a security score. In some embodiments of the present invention, an individual SG score is assigned to each user of an account, and/or to each VM instance. Some embodiments of the present invention adjust the SG score based on trends over time, including security incident free periods and the severity of security incidents that have occurred.

Some embodiments of the present invention define classes of rules that indicate how to respond to suspected malicious behavior according to an SG score corresponding to: (i) a user's SG score; (ii) the individual SG of the security instance in question; and/or (iii) the overall SG score of the customer (note that a given customer may include many users, each provisioning many resources). A customer may have surcharges and/or discounts applied to their account based on: (i) the SG score; (ii) incident history; and/or (iii) actions taken for the security instances associated with the customer. Further, based on a customer's overall SG score, the cloud service provider (CSP) may chose to provide a "security incident" surcharge to: (i) the entire account; and/or (ii) those instances owned by particular users bound to that account. Likewise, the CSP may assign differing security response priorities for handling incident responses for the customer based on: (i) an account security score; (ii) a user security; (iii) an instance security; and/or (iv) a security incident history.

The security level of a given customer or customer component is a function of various factors that may be categorized as either "customer information" or "incident information." Customer information is data that is available independent of a potential security incident. Customer information includes, but is not limited to: (i) Dun and Bradstreet number (Note: the terms "Dun" and "Bradstreet" may be subject to trademark rights in various jurisdictions throughout the world and are used here only in reference to the products or services properly denominated by the marks to the extent that such trademark rights may exist); (ii) length of existing customer relationship; (iii) valid customer website; (iv) billing schedule (for example, whether the customer relationship is based on: a free trial, a fee-based account, a monthly billing cycle; (v) whether the security services were added to an existing customer contract; (vi) extent of services provided by the CSP to the customer; (vii) provenance of the customer; (viii) time "live"; (ix) the account users (such as number of users); (x) user instances; (xi) organizational culture of the customer toward security, such as a customer who has to consider the health insurance portability and accountability act (HIPAA); (xii) extent of trade secret protection; (xiii) extent of government export controls; (xiv) financial data; (xv) payment experiences; (xvi) socio-economic status; (xvii) government data; and/or (xviii) significance of previous security incidents.

Incident information is data that is based on a potential security incident and/or historic incident data. Incident information includes, but is not limited to: (i) whether the customer reported the incident based on: a security-service provider's image, the customer's own image, a third-party image; (ii) reporting e-mail domain, for example: a free domain, such as Hotmail, a business domain of the customer; (iii) whether the reporting e-mail format is proper; (iv) history of reported security incidents of the customer; (v) security incident outcome history, that is, whether the incident turned out to be: (a) real and serious; (b) real, but not serious; or (c) a false alarm; and/or (vi) time since last security incident.

The security scores for various customer components (such as account, user, and instance) are derived from factors related to each customer component. These factors are derived from customer information and/or incident information. The security score for a particular customer account is a score based on the account characteristics including, but not limited to: (i) customer name; (ii) account provenance; (iii) account add-ons; (iv) account billing method; (v) payment history; (vi) lifetime (account age); (vii) reputational score from external security threat services; (viii) time since last security incident; (ix) total number of incidents over account lifetime; and/or (x) weighted score of the incidents and the severity of the incidents over time.

Account characteristics include: (i) who is the customer; and (ii) how well the customer is known. Examples include: Dun and Bradstreet number, existing customer, valid website, etc. Account owner characteristics include information such as: (i) the owner's email ID (for inquiries such as whether the email domain matches that of the customer); and/or (ii) phone number (validated as business number owned by customer and/or assigned to account owner).

The account provenance includes characteristics such as: (i) how the account was created, whether set up as part of a free trial, single purchase order, monthly billing cycle, or add-on to existing services contract; (ii) identifying information about the customer; and/or (iii) identifying information about the account owners. The instance provenance includes characteristics of how the instance was created including being provisioned from: (i) a catalog of images maintained by the CSP; (ii) images contributed by third parties; (iii) a blank infrastructure as a service (IaaS) image configured by the client; and/or (iv) the start of an instance copy. The user provenance includes characteristics of the user identity that has actually provisioned the instance, such as email ID format (for example, a free email domain such as Hotmail and Gmail, a more reputable business-specific domain, a valid customer format ID, and an automatically generated format). (Note: the terms "Hotmail" and "Gmail" may be subject to trademark rights in various jurisdictions throughout the world and are used here only in reference to the products or services properly denominated by the marks to the extent that such trademark rights may exist.)

The account add-ons include characteristics of the extra services associated with an account, such as managed services including: (i) security services; (ii) backup services; and (iii) managed services. An account that includes no add-on services is considered to be "self-managed."

Billing is typically processed monthly, so it is not normally a factor; however, large customers that have included cloud services as part of a large service package with a broad CSP may have other billing and/or payment mechanisms. Generally these large customers already have a reasonably high account-based security score because they typically include managed services such as security services. Payment methods include: (i) credit card; (ii) monthly bank transfers; (iii) automatic bank withdrawals; and/or (iv) services rendered. Payment history includes characteristics of how and if the account bills have been paid and may include factors such as lateness, delinquency, and/or denied CC status.

The lifetime factor refers to the overall lifetime, or age, of an: (i) account; (ii) user activity; and/or (iii) instance. The account age refers to the amount of time that the account itself has been active. Accounts that have been active longer and have established a reputation are generally viewed to have a high security score. The instance lifetime refers to the time an instance has been live, that is, since provisioning. The user lifetime refers to the time that a particular user has been active (typically the user lifetime is the time since the user's first provisioned instance).

The reputational score may include input from external sources where reputational scores are determined for: (i) companies; (ii) domains; and/or (iii) individual sites by their uniform resource locator (URL).

The security score for a particular customer user is a score based on the user's characteristics including, but not limited to: (i) email ID characteristics; (ii) lifetime (time active in account); (iii) number of instances provisioned for a user; (iv) percent of account's total provisioned instances that are provisioned for a user; (v) time since last security incident for a user; (vi) total number of incidents over user's lifetime; and/or (vii) weighted score of the incidents and the severity of the incidents over time.

Both account owners and instance owners typically authenticate with an ID in the form of an email ID. Email and ID characteristics reflect the status of a given ID including: (i) domain name (whether: the domain name matches the company name, the ID is based on a free email account); and (ii) how the email ID was validated (whether a real individual, an individual associated with a given company, and/or an individual associated with a given account).

For each user-provisioned instance, the user may be acting in a role as an administrator, requesting and managing all of an account's provisioned instances or the user may create a one-off instance. The number of instances created and/or managed by a user is important in terms of establishing the user's ability to correctly manage the security of these instances.

Accounts and users may both be associated with multiple VM instances, but not all of the VM instances may be subject to potential security incidents. In these cases, the time "incident free" is a measure of the account's and/or user's improvements or lack thereof over time.

Regarding the severity of the last incident and/or the severity of incidents over time, while all incidents require response and handling by the CSP and corresponding account and/or instance administrators, not all security incidents have the same severity. The severity level of a security incident is one aspect of the "significance" of the incident. Specifically, some incidents may be safely blocked by the network-hosted intrusion protection systems (IPS), whereas other incidents may not be blockable or may be more severe than others. Incidents having a high severity level include, but are not limited to: (i) incidents leading to the hosting of illegal content in the provisioned instances; and (ii) incidents that are part of "botnet" targeting known internet sites. The significance of the incidents associated with a customer over time provides insight as to the increasing or decreasing security level.

The security score for a particular customer VM instance is a score based on a the characteristics of the particular VM instance including: (i) instance name format; (ii) instance provenance (such as catalog, user built, etc); (iii) protection applied (such as configured behind firewall, known to use managed service provider a/v, behind NIDs, known to host HIDS, etc); (iv) lifetime (time "live" since provisioned); (v) time since last security incident for the VM instance; and/or (vi) total number of recoverable incidents over instance lifetime.

It is worth noting that while security incidents may be monitored over time for a given VM instance, this incident information only applies to the security incidents attributed to the same VM instance so long as the incidents are deemed to be of low enough severity level that they do not require a shut down of the instance. Historical data of the security incidents for a given VM instance may be retained after a shut down event, but the VM instance that is shut down is removed from the network environment and cannot be re-started.

Alert module 32 operates generally to identify a potential security incident and the associated customer. Identification of the potential security incident may be made through communication with monitoring programs (not shown) within a network (not shown). Alert module 32 further operates to store the incident information related to the potential security incident in incident information store 60. Alert module 32 identifies the customer associated with the incident as the customer relates to customer components including: (i) a specific VM instance; (ii) user-related instance(s); and/or (iii) account-wide instance(s). In one embodiment, the network is a public cloud. In other embodiments, the network is any type of network, including a local area network (LAN) or a wide area network (WAN), or the connection may be made to an external computer (for example, through the Internet using an Internet service provider (ISP)).

Security score module 33 operates generally to determine and/or update security score(s). Security score module 33 further operates to obtain customer information related to the customer associated with the potential security incident from customer information store 70. The security score module determines and/or updates the security score(s) based on one, or more, of the following: (i) customer information; (ii) incident information; and/or (iii) incident outcome. In some embodiments of the present invention, security score module 33 determines incident multipliers for each security incident based on incident information to adjust security scores based on the determined incident multipliers. In some embodiments of the present invention, security score module 33 further operates to reset an incident-free timer for those potential security incidents that are determined to be real (as opposed to a false alarm).

The security score for a customer is typically a combined security score including an account score, a user score, and an instance score. However, the customer security score is made up of the security scores of the customer components associated with the incident such that, for example, multiple instance scores may be included in the combined score where multiple instances are associated with the incident.

Response module 34 operates generally to determine a responsive action to a potential security incident and report the responsive action to a user. The responsive action takes into account factors for: (i) the security score associated with the incident; (ii) the particular VM instance for which a security incident is reported; (iii) the customer account associated with the reported security incident; and/or (iv) the particular user(s) registered to use the VM instance. Response module 34 essentially determines a responsive action by estimating the significance of the incident. In some embodiments, the responsive action includes instructions to perform a manual investigation into the potential security incident for a specified amount of time to determine a solution prior to shutting down the suspected instance. In other embodiments, the responsive action is to shut down the suspected instance immediately, or to wait for a next, related potential security instance before shutting down the suspected instance.

Outcome module 36 operates to monitor any responsive actions to potential security incidents for outcome data. Outcome data includes: (i) the responsive action (whether no response, fix, shut down, or etc.); (ii) whether the incident was a false alarm; (iii) the amount of investigation required; (iv) whether the incident is determined to be real and serious; (v) whether the incident is determined to be real, but not serious; and/or (vi) if the incident required communication with the account owner, such as a warning to improve behavior.

Figure 2:
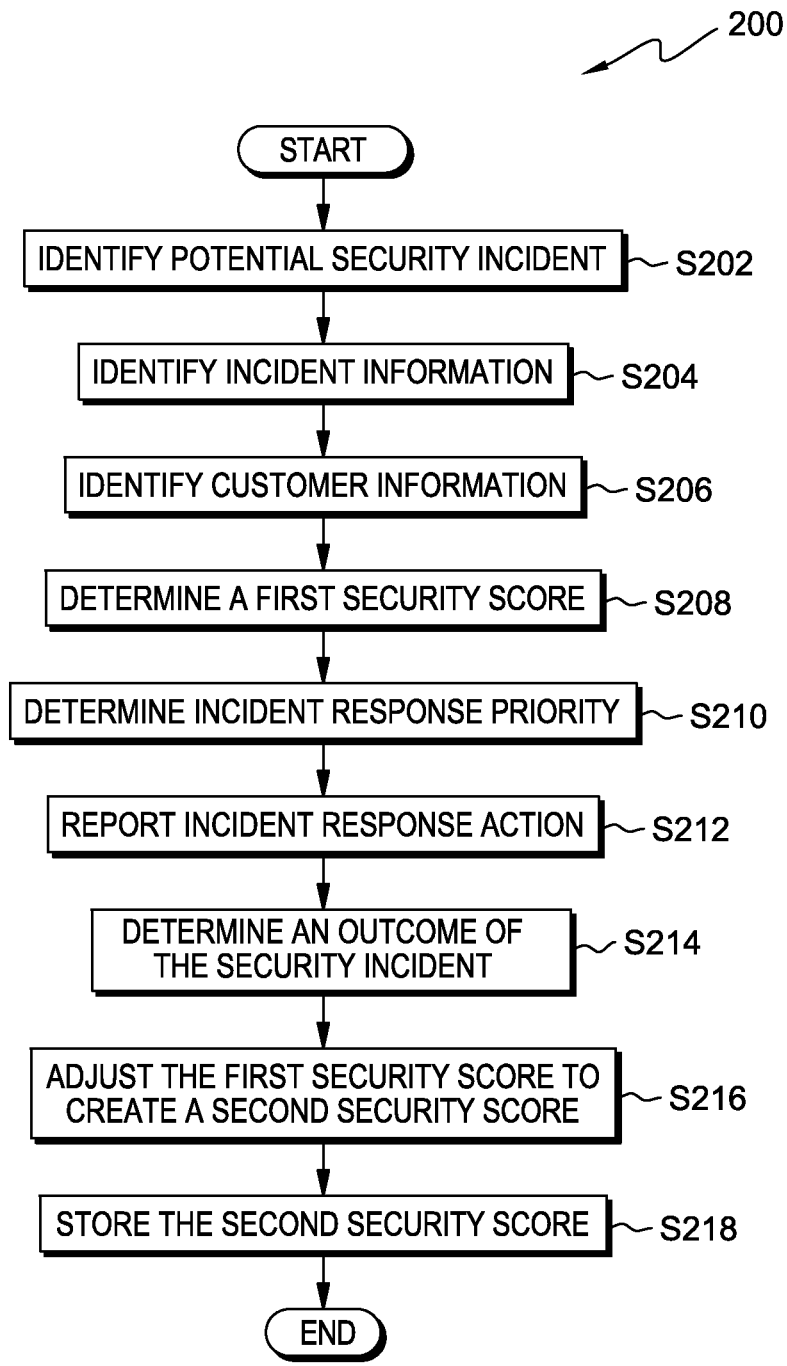
FIG. 2 depicts a flowchart of an incident response program within the computing system of FIG. 1, for estimating the significance of a potential security incident in a networked computers environment in accordance with one embodiment of the present invention.

FIG. 2 shows flowchart 200 depicting the steps of program 30 for estimating the significance of potential security incidents in accordance with an embodiment of the present invention. The steps that follow describe an exemplary method performed by incident response program 30 executing on computing device 20 within computing system 10 of FIG. 1.

Processing begins at step S202, where alert module 32 identifies a potential security incident. In this example, the alert module identifies the potential security incident by receiving an actionable event alert from data processing module 90. As discussed above, the data processing module receives threat-related data from data acquisition and storage module 80. Alternatively, the alert module receives an alert from a conventional public cloud security monitor. Alternatively, alert module 32 acts as the security monitor to identify the potential security incident.

Processing proceeds to step S204, where alert module 32 identifies incident information related to the potential security incident. Incident information, as discussed above, includes information regarding the incident identified as well as customer-specific incident information. In this embodiment, historical customer-related incident information is retrieved from incident information store 60. Alternatively, historical customer-related information is retrieved over a network at, for example, a central repository. In some embodiments of the present invention, incident information includes data received by data acquisition and storage module 80. When the incident information is identified, the alert module estimates the significance of the incident. In this embodiment, there are three degrees of significance: (i) critical; (ii) major; and (iii) minor. In other embodiments, the number of degrees varies according to program design. As the degrees of significance increase, the number of potential responsive actions increases.

In this embodiment, critical incidents are defined as: (i) an incident that is a result of an external abuse notification that coincides with documented evidence of network traffic corresponding to the abuse notification (for example, an external notification is received regarding port sweeping of an internet protocol (IP) address and the IPS indicates that traffic is going to the reported IP address that looks like a port scan); (ii) an incident based on an IPS alert on traffic associated with: (a) a known 0-day attack (a 0-day attack is one that exploits a previously unknown vulnerability in a computer application such that developers have had no time to address and patch), (b) a critical vulnerability, (c) talking to a known bad IP, and/or (d) an identified alert of interest; and/or (iii) an incident based on numerous security instances (for example, there exists an IPS report that numerous machines are involved in a particular type of malicious traffic as well as coinciding port traffic level records that support the IPS report).

In this embodiment, major incidents are defined as: (i) an incident based on an IPS alert rated critical, or high, from managed security services (MSS), but no corresponding information from other sources such as reputable external sources; and/or (ii) an IPS alert rated critical, or high, from managed security services (MSS), but does not coincide with known active threats.

In this embodiment, minor incidents are defined as: (i) an incident based on an IPS alert rated medium, or low, from MSS, but there are no non-incident related explanations (for example, Windows 2008 domain controllers triggering ASN.1 Kerberos Overflow notifications due to normal traffic). (Note: the terms "Windows 2008" and "Kerberos Overflow" may be subject to trademark rights in various jurisdictions throughout the world and are used here only in reference to the products or services properly denominated by the marks to the extent that such trademark rights may exist.) Minor incidents may require further investigation to determine if the reported incident has valid explanations as to the cause or the need to have incident-related actions taken.

Processing proceeds to step S206, where alert module 32 retrieves customer information from customer information store 70 for the customer associated with the potential security incident. As stated above, customer information is generally available independent of the potential security incident. Accordingly, this information may be obtained, updated, and/or stored in advance of the occurrence of the incident.

Processing proceeds to step S208, where response module 34 determines a first security score based on the identified potential security incident and customer information. Each of the various pieces of information is weighted according to a set of predetermined rules for determining or adjusting a customer's security score. According to some embodiments of the present invention, each account, user, and/or instance may have individual security scores. Exemplary security score multipliers are provided in Tables 1-3 according to certain customer components.

TABLE 1

Account Security Score Multipliers

| ACCOUNT ATTRIBUTE | MULTIPLIER |
|---|---|
| Free Trial for New Customer | 0.00 |
| Free Trial for Current Customer | 0.50 |
| Web-based Engagement by New Customer | 0.20 |
| Web-based Engagement by Current Customer | 0.50 |
| Credit card payment | 0.50 |
| New Customer Engagement via Account Rep. | 0.50 |
| Current Customer Engagement via Account Rep. | 0.75 |
| Account managed by known $3^{rd}$ Party Security Service | 1.00 |

TABLE 2

User Security Score Multipliers

| ACCOUNT ATTRIBUTE | MULTIPLIER |
|---|---|
| User E-mail ID Bound to Current Customer | 1.00 |
| User E-mail ID Not Bound to Current Customer | 0.00 |
| User History for Previous Accounts is GOOD | 1.00 |
| User History for Previous Accounts is FAIR | 0.75 |
| User History for Previous Accounts is POOR | 0.50 |

TABLE 3

Instance Security Score Multipliers

| ACCOUNT ATTRIBUTE | MULTIPLIER |
|---|---|
| Instance Established Through a Free Trial | 0.50 |
| Instance Established Through a Web-based Engagement | 0.50 |
| Instance Established Through an Account Rep. | 1.00 |
| Provisioned from a Catalog Managed by a Provider that includes base tools for security management | 1.00 |
| Provisioned from a Catalog Managed by a Provider that does not include base tools for security management | 0.75 |
| Provisioned from a Catalog Managed by a Provider and image created as fully patched and includes base tools for security management | 0.75 |
| Provisioned from a Catalog Managed by a Provider | 0.20 |

Further regarding example security score adjustments, security scores may be adjusted based on elapsed time since last potential security incident. For example, an account's security score increases by a multiplier of 1.10 per time period (week, month, quarter) until the account security score is greater than or equal to 1.00. The user or instance customer component scores may be adjusted by a different multiplier, having more or less weight than the account score. For example, the user security score may only increase by a multiplier of 1.05.

Processing proceeds to step S210, where response module 34 determines the response priority for the potential incident based on the first security score. The incident response priority establishes: (i) the response time; and/or (ii) the responsive action(s). In this embodiment, the security score varies from 0.00 to 1.00, where higher security scores indicate lower priority responses. An example incident response matrix is shown in Table 4, below.

TABLE 4

Incident Response Matrix

| SIGNIFICANCE OF INCIDENT | SECURITY SCORE | RESPONSE PRIORITY ACTION |
|---|---|---|
| CRITICAL | 0-1 | Automatic shutdown |
| MAJOR | >0.75 | Wait 4 hours for manual investigation |
|  | >0.5 | Wait 2 hours for manual investigation |
|  | Default | Wait 30 mins for manual investigation |
| MINOR | >0.75 | Wait 24 hours for manual investigation |
|  | >0.5 | Wait 12 hours for manual investigation |
|  | Default | Wait 30 mins for manual investigation |

For example, if the significance of the incident is estimated to be Major, and the combined security score is 0.25, the response priority may be to wait two hours for a manual investigation to be performed prior to shutting down the system. However, if the combined security score were 0.80 for the same incident, the response priority may be to wait four hours for a manual investigation to be performed prior to shutting down the system.

Processing proceeds to step S212, where response module 34 reports incident response action according to the determined response priority. In this embodiment, response module 34 reports the response action through UI 50 as a pop-up window. Alternatively, response module 34 transmits the response action via wireless communication network (discussed with respect to FIG. 3) to a smart phone as a text message. Alternatively, the reported response action is communicated according to the system designer's preference. In some embodiments, the user selects a preferred communication process.

Processing proceeds to step S214, where outcome module 36 determines an outcome of the potential security incident. An outcome of the incident response includes, but is not limited to: (i) shutdown a virtual machine instance; (ii) false alarm; (iii) investigation time; (iv) the potential security incident was real and serious; (v) the potential security incident was real, but not serious; and/or (vi) warning issued to customer. In this embodiment, outcome module 36 receives outcome information from user input via UI 50. Alternatively, the outcome module receives the reported responsive action from response module 34 and prompts the user via UI 50 to select the actual outcome from a list of possible outcomes.

Processing proceeds to step S216, where security score module 33 adjusts the first security score determined in step S208 to a second security score based on the determined outcome of the potential security incident in step S214. The security score is adjusted according to the outcome information for each potential security incident. For each incident, based on significance, the security score decreases or increases by a predetermined multiplier. Exemplary multipliers include: (i) for a minor incident with no response action taken, the multiplier is 0.95; (ii) for a minor incident with a response being to fix or remediate false alarms, the multiplier is 0.90; (iii) for a minor incident where an instance shut-down is performed, the multiplier is 0.75; (iv) for any major incident, the multiplier is 0.50; and (v) for a critical incident, the multiplier is 0.25. It should be noted that when an instance is shut down, the security score for that instance is no longer relevant, but the starting point for new instances created by the same account and/or user may be adjusted by the instance multiplier.

Processing proceeds to step S218, where security score module 33 stores the second security score in security score database 40.

Some embodiments of the present invention may include one, or more, of the following features, characteristics and/or advantages: (i) uses reputational information, including historic values and intangible values, to provide formal justification for response decisions; (ii) assigns a weighted value to each of the various input factors and/or characteristics; (iii) uses assigned values to define the response to risk occurrences, or incident reports; (iv) combine and consider multiple characteristics for account owners, account users, and virtual machine instances associated with users and user accounts to identify the type and timing of response to take when a potential security incident is identified; (v) provides a predictable and flexible way for handling security incident responses; (vi) provides a predictable and flexible way for establishing pricing to recover the cost of operational management; (vii) provides a predictable and flexible way for establishing pricing to incentivize improved client behavior; (viii) defines a weighted, multi-factor approach to account for alert instances and user characteristics; (ix) provides a guide for security incident response to provide the appropriate protection of a cloud service provider (and their reputation) using information and usage data about the user's provisioned instances and their history in securing those instances; (x) provides the type of protection a cloud service provider (CSP) needs to have for the overall cloud environment; (xi) ensures that well-behaved users of the public cloud environment will not be impacted by, or share the burden of increased fees with, the inexperienced or hostile users of this environment; (xii) defines a clear and actionable path to determine appropriate, prioritized incident response; (xiii) allows for a clear and well-defined approach to the pricing of incident response handling to support cost recovery and behavior modification of account owners; (xiv) provides for a cloud service provider to provide greater control of a dynamic, public cloud environment; and/or (xv) use of an overall SG score at the time of a security incident to determine the action to take (such cases arise when there is uncertainty as to how to respond).

Some embodiments of the present invention may include one, or more, of the following features, characteristics and/or advantages: (i) the SG scores for the account, user, and instance (if instance is not shut down) are automatically adjusted in response to the initial severity of the incident; (ii) the SG score is further adjusted according to any actions taken as a result of an investigation; (iii) automatic account shutdown if all of the associated SG scores drop below a certain level; (iv) banning individual users if their SG score drops below a certain level; (v) tuning the infrastructure and/or services offered in response to repeat security incidents (even in the presence of add-on services); (vi) the SG score is used to apply discount and surcharge pricing to the rates applied to the account and the instances provisioned within that account; (vii) pricing adjustment is applied to those instances of an account owned by a single user; (viii) pricing adjustment is applied as a "penalty" (post-shutdown) for an instance that is associated with a user or an account with a poor SG score; (ix) calculates discounts and surcharges based on the current SG score(s) of the account, user, and/or instance; (x) uses characteristics of an account (including the account owner, the service "add-ons" to the account, the overall incident and response history of instances in the account) to calculate a score that defines the type of response to provide to a reported (but not confirmed) security incident; (xi) uses characteristics of the users of the account (including their history of securing their instances) to calculate a score that defines the type of response to provide to a reported (but not confirmed) security incident; (xii) uses characteristics of the instances themselves (including the instance's provenance and the overall history of incidents associated with the instance) to calculate a score that defines the type of response to provide to a reported (but not confirmed) security incident; (xiii) uses overall characteristics and history of an account, users, and/or instances to provide differing response types to an given security incident based on the instance characteristics, the user's history and characteristics and the account's overall history and characteristics; (xiv) uses overall characteristics and history of an account, users, and/or instances to provide differing bonus (history of strong/good security) and penalties (history of poor security/repeat security incidents) to individual instances within an account, instances provisioned by a given user, and/or all instances within an account; (xv) uses the overall customer history (recent and past) to dynamically adjust the security goodness (SG) score of a user, account and individual instances for the purposes of defining point-in-time security response characteristics; and/or (xvi) uses the overall customer history (recent and past) to dynamically adjust the SG score of a user, account and individual instances for the purposes of defining point-in-time pricing discount or surcharge characteristics.

Figure 3:
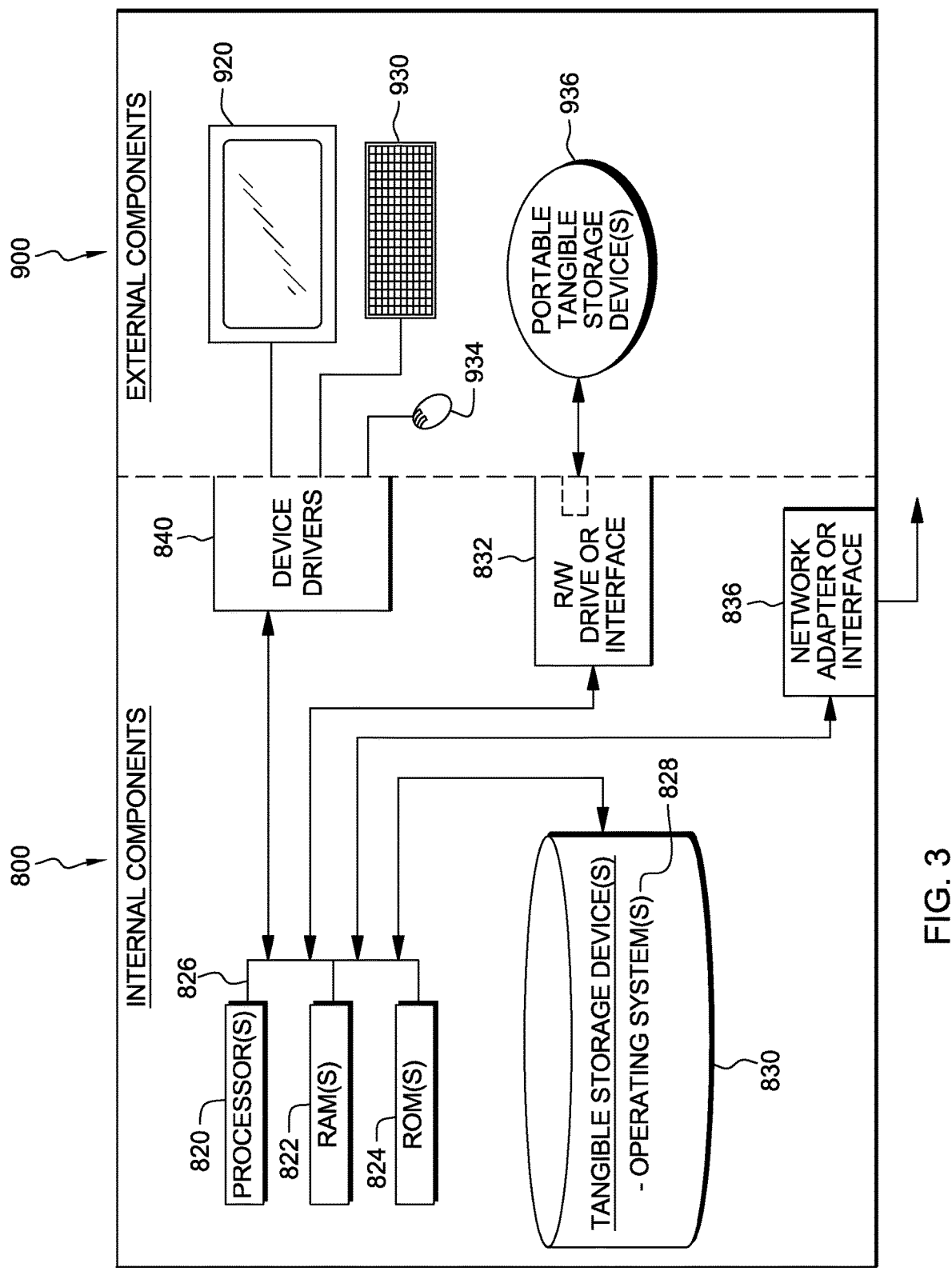
FIG. 3 is a block diagram of internal and external components of the computing device of FIG. 1 in accordance with one embodiment of the present invention.

FIG. 3 is a block diagram of internal and external components of computing device 20 in accordance with one embodiment of the present invention.

Computing device 20 includes a set of internal components 800 and external components 900 illustrated in FIG. 3. The set of internal components 800 includes one or more processors 820, one or more computer-readable RAMs 822 and one or more computer-readable ROMs 824 on one or more buses 826, one or more operating systems 828 and one or more computer-readable storage devices 830. The one or more operating systems 828, incident response program 30, security score database 40, UI 50, incident information store 60, and customer information store 70 are stored on one or more of the respective computer-readable storage devices 830 for execution and/or access by one or more of the respective processors 820 via one or more of the respective RAMs 822 (which typically include cache memory).

In the embodiment illustrated in FIG. 3, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store, but does not transmit, a computer program and digital information.

The set of internal components 800 also includes a R/W drive or interface 832 to read from and write to one or more portable computer-readable storage devices 936 that can store but do not transmit a computer program, such as a CD-ROM, DVD, memory stick, magnetic tape, magnetic disk, optical disk or semiconductor storage device. Incident response program 30, security score database 40, UI 50, incident information store 60, and customer information store 70 can be stored on one or more of the respective portable computer-readable storage devices 936, read via the respective R/W drive or interface 832 and loaded into the respective hard drive or semiconductor storage device 830. The term "computer-readable storage device" does not encompass a copper cable, optical fiber or wireless media, to propagate signals.

The set of internal components 800 also includes a network adapter or interface 836 such as a TCP/IP adapter card or wireless communication adapter (such as a 4G wireless communication adapter using OFDMA technology). Incident response program 30, security score database 40, UI 50, incident information store 60, and customer information store 70 can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

The set of external components 900 includes a display 920, a keyboard or keypad 930, and a computer mouse or touchpad 934. The sets of internal components 800 also includes device drivers 840 to interface to display 920 for imaging, to keyboard or keypad 930, to computer mouse or touchpad 934, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java, C+) including low-level, high-level, object-oriented, or non object-oriented languages. Alternatively, the functions of the programs can be implemented in whole or in part by computer circuits and other hardware (not shown).

Based on the foregoing, a method, program product and computer system has been disclosed for prioritizing a security incident response in a networked computers environment. However, numerous modifications and substitutions can be made without deviating from the scope of the present invention. Therefore, the present invention has been disclosed by way of example and not limitation.

The invention claimed is:

1. A method for taking an immediate responsive action to a current security incident, the method comprising the steps of:
   receiving an incident report from a customer in a public cloud environment for a first virtual machine instance, the customer seeking an incident response from one or more administrators, the incident report identifying a current security incident affecting the first virtual machine instance;
   receiving, from the one or more administrators, a plurality of incident information datasets respectively corresponding to a plurality of actual severities for a plurality of prior security incidents reported for the virtual machine instance and customer information collected prior to receiving the incident report;
   generating a security score for the virtual machine instance based at least in part on:
      the plurality of actual severities for the plurality of prior security incidents, wherein a high actual severity of a prior security incident supports an estimate of a high security score for the virtual machine instance,
      the plurality of incident information datasets, wherein a basis for the incident report being from a third party image supports a high security score for the virtual machine instance, and
      the customer information, wherein the customer being associated with a current customer engagement via an account representative supports a higher security score than the customer being associated with a web-based engagement by a new customer;
   determining, by a processor, a severity level of the current security incident based on the security score for the virtual machine instance;
   responsive to the security level indicating an immediate responsive action, shutting down the virtual machine instance while retaining a historical dataset of the security incidents for the virtual machine instance; and
   reporting, to the one or more administrators, by the processor, the estimated severity level of the current security incident and the immediate responsive;
   wherein:
   the customer information is data available independent of the current security incident including: length of customer engagement and basis of billing schedule with the customer.

2. The method of claim 1 wherein:
   the customer information further includes an extent of services provided to customer; and
   the basis of billing schedule is a free trial.

3. The method of claim 1 wherein:
   the incident report is received as an email message reporting a potential security incident; and
   the plurality of incident information datasets includes an e-mail domain of the e-mail message reporting the potential security incident.

4. The method of claim 1 wherein the current security incident is based on one, or more, of the following: a security-service provider's image, a customer's own image, and a third party image.

5. The method of claim 1 wherein the plurality of prior security incidents are identified according to one, or more, of the following: an account, an account user, and a virtual machine instance.

6. The method of claim 1 further comprising the step of:
identifying the actual severity for the current security incident based on an outcome of the immediate responsive action to the current security incident.

7. A computer program product for taking an immediate responsive action to a current security incident, the computer program product comprising a non-transitory computer readable storage medium having stored thereon:
first program instructions programmed to receive an incident report from a customer in a public cloud environment for a first virtual machine instance, the customer seeking an incident response from one or more administrators, the incident report identifying a current security incident affecting the first virtual machine instance;
second program instructions programmed to receive from the one or more administrators, a plurality of incident information datasets respectively corresponding to a plurality of actual severities for a plurality of prior security incidents reported for the virtual machine instance and customer information collected prior to receiving the incident report;
third program instructions programmed to estimate, by a processor, a severity of the current security incident by generating a security score for the virtual machine instance based at least in part on:
the plurality of actual severities for the plurality of prior security incidents, wherein a high actual severity of a prior security incident supports an estimate of a high security score for the virtual machine instance,
the plurality of incident information datasets, wherein a basis for the incident report being from a third party image supports a high security score for the virtual machine instance, and
the customer information, wherein the customer being associated with a current customer engagement via an account representative supports a higher security score than the customer being associated with a web-based engagement by a new customer;
fourth program instructions programmed to determine a severity level of the current security incident based on the security score for the virtual machine instance;
fifth program instructions programmed to, responsive to the security level indicating an immediate responsive action, shut down the virtual machine instance while retaining a historical dataset of the security incidents for the virtual machine instance; and
sixth program instructions programmed to report, to the one or more administrators, by the processor, the estimated severity level of the current security incident and the immediate responsive action;
wherein:
the customer information is data available independent of the current security incident including: length of customer engagement and basis of billing schedule with the customer.

8. The computer program product of claim 7 wherein:
the customer information further includes an extent of services provided to customer; and
the basis of billing schedule is a free trial.

9. The computer program product of claim 7 wherein:
the incident report is received as an email message reporting a potential security incident; and
the plurality of incident information datasets includes an e-mail domain of the e-mail message reporting the potential security incident.

10. The computer program product of claim 7 wherein the current security incident is based on one, or more, of the following: a security-service provider's image, a customer's own image, and a third party image.

11. The computer program product of claim 7 wherein the plurality of prior security incidents are identified according to one, or more, of the following: an account, an account user, and a virtual machine instance.

12. The computer program product of claim 7 wherein the computer readable storage medium further has stored thereon:
seventh program instructions programmed to identify the actual severity for the current security incident based on an outcome of the immediate responsive action to the current security incident.

13. A computer system for taking an immediate responsive action to a current security incident, the computer system comprising:
a processor(s) set; and
a computer readable storage medium;
wherein:
the processor set is structured, located, connected and/or programmed to run program instructions stored on the computer readable storage medium; and
the program instructions include:
first program instructions programmed to receive an incident report from a customer in a public cloud environment for a first virtual machine instance, the customer seeking an incident response from one or more administrators, the incident report identifying a current security incident affecting the first virtual machine instance;
second program instructions programmed to receive from the one or more administrators, a plurality of incident information datasets respectively corresponding to a plurality of actual severities for a plurality of prior security incidents reported for the virtual machine instance and customer information collected prior to receiving the incident report;
third program instructions programmed to estimate, by a processor, a severity of the current security incident by generating a security score for the virtual machine instance based at least in part on:
the plurality of actual severities for the plurality of prior security incidents, wherein a high actual severity of a prior security incident supports an estimate of a high security score for the virtual machine instance,
the plurality of incident information datasets, wherein a basis for the incident report being from a third party image supports a high security score for the virtual machine instance, and
the customer information, wherein the customer being associated with a current customer engagement via an account representative supports a higher security score than the customer being associated with a web-based engagement by a new customer;
fourth program instructions programmed to determine a severity level of the current security incident based on the security score for the virtual machine instance;
fifth program instructions programmed to, responsive to the security level indicating an immediate responsive action, shut down the virtual machine instance while retaining a historical dataset of the security incidents for the virtual machine instance; and
sixth program instructions programmed to report, to the one or more administrators, by the processor, the estimated severity level of the current security incident and the immediate responsive action;

wherein:

the customer information is data available independent of the current security incident including: length of customer engagement and basis of billing schedule with the customer.

14. The computer system of claim 13 wherein:

the customer information further includes an extent of services provided to customer; and the basis of billing schedule is a free trial.

15. The computer system of claim 13 wherein:

the incident report is received as an email message reporting a potential security incident; and the plurality of incident information datasets includes an e-mail domain of the e-mail message reporting the potential security incident.

16. The computer system of claim 13 wherein the current security incident is based on one, or more, of the following: a security-service provider's image, a customer's own image, and a third party image.

17. The computer system of claim 13 wherein plurality of prior security incidents are identified according to one, or more, of the following: an account, an account user, and a virtual machine instance.

18. The computer system of claim 13 wherein the program instructions further include:

seventh program instructions programmed to identify the actual severity for the current security incident based on an outcome of the immediate responsive action to the current security incident.

* * * * *